United States Patent Office 3,045,810
Patented July 24, 1962

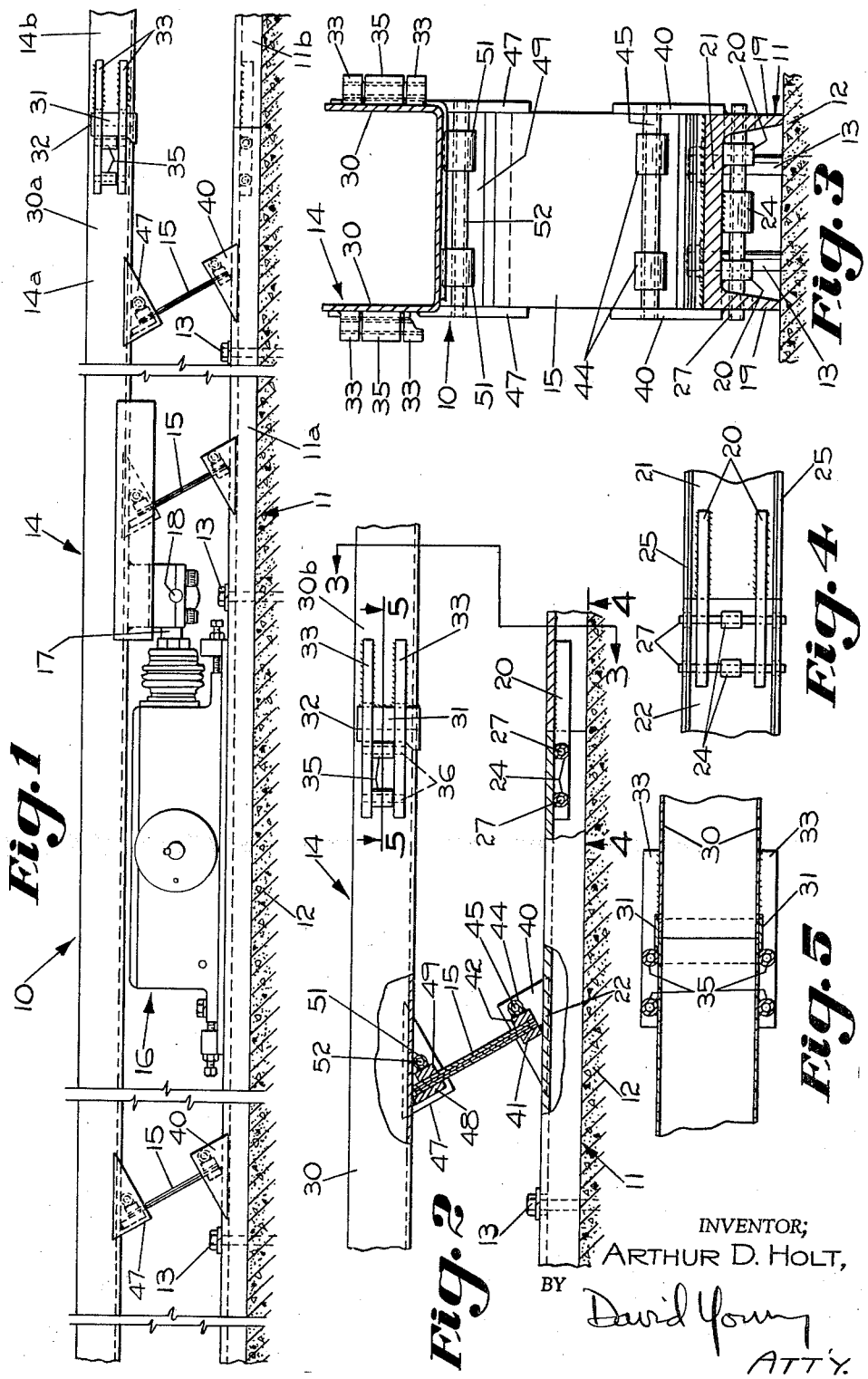

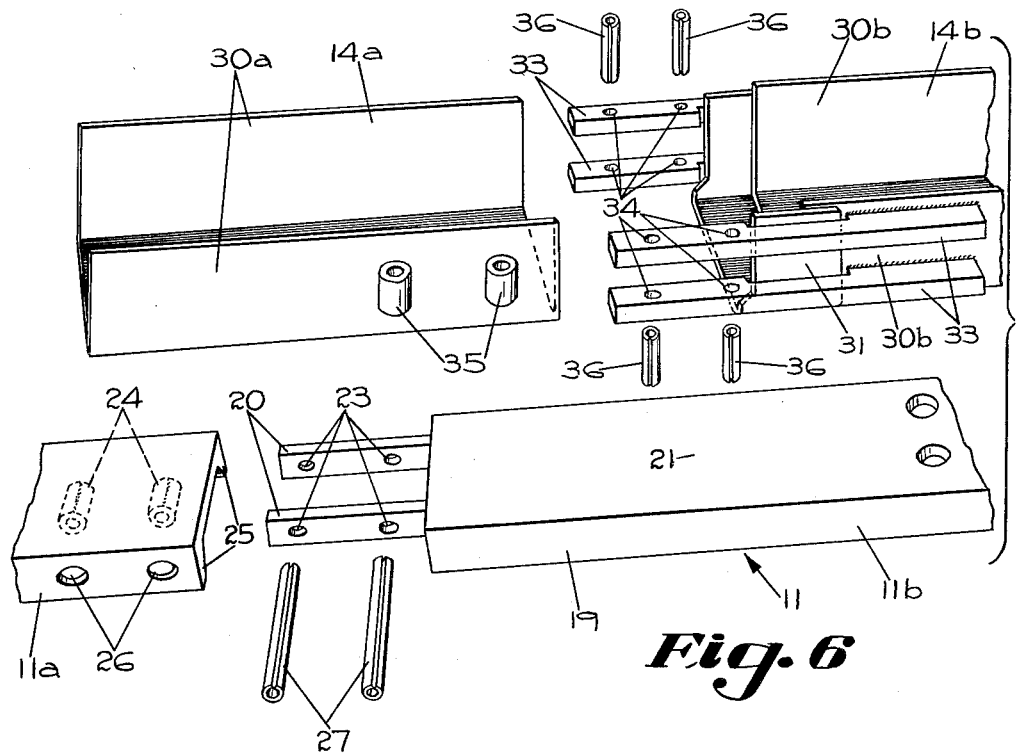
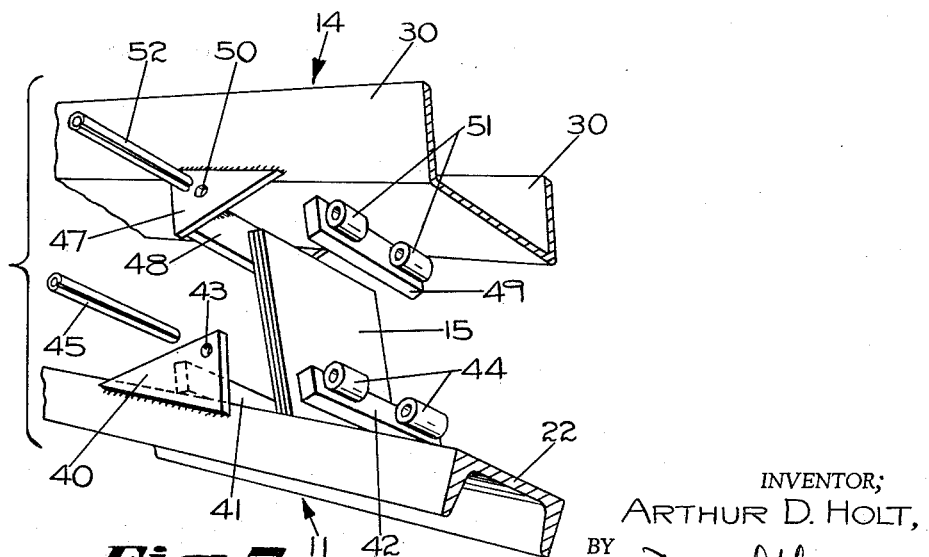

3,045,810
VIBRATING CONVEYOR AND ASSEMBLY
MEANS THEREFOR
Arthur D. Holt, Columbus, Ohio, assignor, by mesne assignments, to The Jeffrey Galion Manufacturing Company, a corporation of Ohio
Filed July 19, 1960, Ser. No. 43,953
8 Claims. (Cl. 198—220)

The instant invention relates to vibrating conveyors, and, more particularly, to an improved means for assembling the elements thereof.

It is an object of the instant invention to provide a vibrating conveyor having improved means for assembling the elements of the conveyor, by which the elements of the conveyor may be readily assembled and disassembled.

It is another object of the instant invention to provide a vibrating conveyor in which the elements thereof are assembled through the use of locking pins which may be readily tapped in place, and in which the elements of the vibrating conveyor may also be disassembled in the same manner.

It is a further object of the instant invention to provide a vibrating conveyor in which spring locking pins are utilized for assembling the elements of the conveyor.

It is also an object of the instant invention to provide a vibrating conveyor in which the elements thereof are assembled by locking pins which are loaded in shear to utilize the greatest strength characteristic of the locking pins.

Still another object of the instant invention is to provide a vibrating conveyor including improved means for assembly of the elements of the vibrating conveyor, by which the elements of the conveyor can be accurately assembled without any requirement of skill or experience.

A still further object of the instant invention is to provide a vibrating conveyor with an improved means for assembly of the elements of the vibrating conveyor by which the vibrating conveyor elements may be quickly assembled or disassembled.

Yet another object of the instant invention is to provide a vibrating conveyor having improved means for assembly of the elements thereof which gives the vibrating conveyor a smooth and clean appearance.

Other objects of the invention will appear hereinafter, the novel features and combinations being set forth in the appended claims.

In the accompanying drawings:
FIG. 1 is a side elevational view of a vibrating conveyor constructed in accordance with the instant invention;
FIG. 2 is an enlarged side elevational view of a portion of the vibrating conveyor, partially in section;
FIG. 3 is a sectional view of the vibrating conveyor taken on the line 3—3 in FIG. 2;
FIG. 4 is a bottom view of the vibrating conveyor base member taken on the line 4—4 in FIG. 2;
FIG. 5 is a sectional view of the vibrating conveyor deck taken on the line 5—5 in FIG. 2;
FIG. 6 is an exploded perspective view of the vibrating conveyor deck and base member; and
FIG. 7 is an exploded perspective view of the vibrating conveyor deck and base member and including a vibrator bar.

Referring to the drawings, there is illustrated therein a vibrating conveyor 10 having a base member 11 which is fixedly secured to a suitable foundation 12 by a plurality of anchor bolts 13. A longitudinally extending conveying deck 14 is disposed above the base member 11 in spaced relation to the latter. A plurality of flexible vibrator bars 15, which extend upwardly from the base member 11 to the conveying deck 14 in rearwardly inclined disposition, support the conveying deck 14 on the base member 11 for vibration relatively thereto, it being understood that material is conveyed in a longitudinal direction by vibration of the conveying deck 14.

A power unit 16 is fixedly secured to the base member 11 and is disposed between the latter and the conveying deck 14. The power unit 16 may be of a known form, for example, one which includes an eccentric which is rotated to drive a connecting rod 17 which is secured to the underside of the conveying deck 14 by a pivot pin 18. The power unit 16 drives the connecting rod 17 forwardly and rearwardly, thereby vibrating the conveying deck 14 forwardly and rearwardly on the flexible vibrator bars 15 in the usual manner.

The vibrating conveyor 10 may be constructed to any desired length by the provision of conveyor sections which are joined end to end. Each conveyor section, so joined, will include a conveying deck 14 supported on a base member 11 by vibrator bars 15, the respective base members 11 and conveying decks 14 being connected to each other end to end, whereby the full length of the vibrating conveyor 10 is anchored to the foundation 12, and the vibratory force is transmitted to the respective conveying deck sections for vibratory movement of the latter in unison.

The base member 11 comprises a first base member section 11a and a second base member section 11b, which are joined to each other in end to end disposition with the base member sections 11a, 11b longitudinally aligned one with the other. Each of the base member sections 11a, 11b is similarly formed of a channel member with the legs 19 thereof supporting the base member 11 on the foundation 12. The base member section 11b includes a pair of laterally spaced connector bars 20, which are secured, as by welding, to the web 21 of the base member section 11b. The connector bars 20 are disposed in parallel disposition and extend from the base member section 11b to the base member section 11a to overlap the web 22 of the latter.

The overlapping ends of the connector bars 20 are each formed with a pair of longitudinally spaced apertures 23. A pair of thimbles 24 are secured to the web 22 of the base member section 11a, with the bores of the thimbles 24 being disposed in alignment with the apertures 23 in the connector bars 20. The bores of the thimbles 24 and the apertures 23 are of the same diameter. The opposite legs 25 of the base member section 11a include apertures 26, which are aligned with the apertures 23 of the connector bars 20 and with the bores of the thimbles 24, and are of substantially larger diameter than the apertures 23 and the bores of the thimbles 24. A pair of cylindrical spring locking pins 27 are utilized for connecting the one base member section 11a to the second base member section 11b. Each locking pin 27 is inserted into a pair of aligned apertures 23 and the bore of an aligned thimble 24. The apertures 26 in the legs 25 of the base member section 11a provide access for insertion of the spring locking pins 27. The apertures 23 and the bores of the thimbles 24 are of such diameter that the spring locking pins 27 must be driven into the apertures 23 and into the thimbles 24, as by tapping the locking pins 27 with a hammer. The locking pins 27 are thereby compressed and securely held in the apertures 23 and in the thimbles 24 to securely join the first and second base member sections 11a and 11b. The locking pins 27 may similarly be removed by tapping them with a hammer to force them out of the apertures 23 and the thimbles 24 for separation of the base members 11a, 11b in disassembly of the vibrating conveyor 10.

The conveying deck 14 similarly comprises a first conveying deck section 14a and a second conveying deck section 14b, which may be joined to each other end to end in longitudinal alignment for providing the desired length of the vibrating conveyor 10. The conveying deck 14 has a trough configuration including upstanding opposite side walls 30. The second conveying deck section 14b includes a seal plate 31, which is secured thereto and has a configuration that is complemental to that of the conveying deck 14. The seal plate 31 is secured to the second conveying deck section 14b as by welding, and extends from the latter to the first conveying deck section 14a to overlap the first conveying deck section 14a. The seal plate 31 thus seals the butt joint 32 between the adjacent conveying deck sections 14a, 14b to prevent any loss of material through the joint 32.

The conveying deck section 14b includes a pair of spaced connector bars 33 at each side thereof, which extend in a longitudinal direction and are parallel to each other. A pair of connector bars 33 is provided at each side of the second conveying deck section 14b, and is secured to the upstanding side walls 30b thereof as by welding. The connector bars 33 extend from the second conveying deck section 14b to the first conveying deck section 14a and overlay the latter. Each pair of connector bars 33 includes a pair of apertures 34, with the apertures 34 in the individual connector bars 33 being disposed in upright alignment with each other. A pair of thimbles 35 are secured to each side wall 30a of the first conveying deck section 14a, disposed between a pair of connector bars 33. The bore of each thimble 35 is disposed in alignment with the apertures 34 in the connector bars 33 at each side of the thimble 35. A spring locking pin 36 is adapted to be inserted through a thimble 35 and the adjacent bores 34 of the connector bars 33 for securing the conveying deck sections 14a, 14b to each other. The bores of the thimbles 35 and the apertures 34 of the connector bars 33 are of the same diameter, and are of such diameter that the cylindrical spring locking pins 36 must be press fitted into the thimbles 35 and the apertures 34. The spring locking pins are inserted by tapping the latter, as with a hammer, through the apertures 34 and the thimbles 35. The spring locking pins 36 are thus securely held in the thimbles 35 and the connector bars 33, and firmly connect the conveying deck sections 14a, 14b to each other for the transmission of vibrating forces from the first conveying deck section 14a to the second conveying deck section 14b.

The flexible vibrator bars 15 support the conveying deck 14 on the base member 11, and are firmly secured to each of the base member 11 and the conveying deck 14, to permit vibration of the conveying deck 14 relatively to the base member 11. Each vibrator bar 15 may, if desired, be made up of several individual bars of flexible material, which are secured in the assembly together to thereby constitute them as a single vibrator bar 15. The lower end of each vibrator bar 15 is firmly secured to the base member 11. Each vibrator bar 15 extends upwardly from the base member 11 and is rearwardly inclined, and the upper end of each vibrator bar 15 is firmly secured to the conveying deck 14.

The structure for securing a vibrator bar 15 between the base member 11 and the conveying deck 14 comprises a pair of upstanding ears 40 disposed one at each side of the base member 11, and secured thereto, as by welding. Each ear 40 may be of a triangular configuration, as illustrated in the drawings, and extends upwardly above the web 22 of the base member 11. A pad 41 extends laterally between the opposite ears 41, and is secured to the ears 40 and to the base member 11, as by welding. The pad 41 is disposed in inclined position to parallel the inclined disposition of the vibrator bar 15. The lower end of the vibrator bar 15 is placed against the pad 41, and a clamp bar 42 is placed against the lower end of the vibrator bar 15 opposite the pad 41 for securing the lower end of the vibrator bar 15 to the base member 11, with the lower end of the vibrator bar 15 clamped between the clamp bar 42 and the pad 41.

Each of the ears 40 has an aperture 43 formed therein near the apex of the ear 40. A pair of thimbles 44 are secured to the rear of the clamp bar 42, as by welding. The bores of the thimbles 44 are aligned with the apertures 43 in the ears 40 when the clamp bar is disposed opposite the pad 41. The bores of the thimbles 44 and the apertures 43 are of the same diameter. A cylindrical spring locking pin 45 is utilized for securing the clamp bar 42 to the ears 40 and to the base member 11. The spring locking pin 45 is inserted through the apertures 43 and bores of the thimbles 44. The apertures 43 and the bores of the thimbles 44 are of such size that the spring locking pin 45 must be press fitted into the apertures 43 and into the bores of the thimbles 44, whereby the locking pin 45 is secured held in position and serves to secure the clamp bar 42 against the vibrator bar 15 and the pad 41. The spring locking pin 45 is applied by tapping it through the apertures 43 and the thimbles 44, as by use of a hammer. The spring locking pin 45 may similarly be removed for releasing the clamp bar 42.

A pair of ears 47 are secured one to each side of the conveying deck 14. The ears 47 are of a triangular configuration and depend below the bottom of the conveying deck 14 at each side thereof. A pad 48 extends transversely between the opposite ears 47 and is secured to the underside of the conveying deck 14 and to the ears 47, as by welding. The pad 48 is disposed in an inclined position to parallel the inclined disposition of the vibrator bar 15, with the upper end of the latter being placed against the pad 48. There is provided a clamp bar 49 which is placed against the upper end of the vibrator bar 15 opposite the pad 48 for securing the upper end of the vibrator bar 15 to the conveying deck 14. The ears 47 each includes an aperture 50. A pair of thimbles 51 are secured to the rear side of the clamp bar 49, as by welding. The apertures 50 and the bores of the thimbles 51 are disposed in alignment with each other and are of the same diameter. A cylindrical spring locking pin 52 is inserted through the apertures 50 and through the bores of the thimbles 51 to secure the clamp bar 49 against the vibrator bar 15 for clamping the latter to the pad 48 and to vibrating deck 14. The diameter of the apertures 50 and of the bores of the thimbles 51 is of such size that the spring locking pin 52 must be press fitted into the apertures 50 and into the bores of the thimbles 51, which is accomplished by tapping the spring locking pin 52 with a hammer. The spring locking pin 52 may be removed from the assembly in the same manner.

From the foregoing description it will be seen that the various elements of the vibrating conveyor are assembled through the use of spring locking pins, which may be readily and accurately applied for correctly assembling the elements of the vibrating conveyor without any requirement of skill or experience on the part of the person making the assembly. The spring locking pins illustrated herein are formed with a tubular configuration of spring material, and split in an axial direction along one side. Thus, when the spring locking pins are applied they are compressed, which serves to firmly secure the locking pins in place, and they are effective to hold together the elements in which the locking pins are received. The particular locking pin, illustrated herein, is merely one form of such device, and it will be understood that other forms of locking pins may be utilized in practicing the instant invention. The spring locking pins are readily removed for dsassembly of the vibrating conveyor and can be used again, should it be desired to reassemble the elements of the vibrating conveyor. It is also a characteristic of the spring locking pins that they possess great strength in shear, and the structure disclosed herein for utilizing the spring locking pins loads the latter in shear, and thus takes advantage of this characteristic of the locking pins, which serves to strengthen the vibrating conveyor structure.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A vibrating conveyor comprising a conveying deck adapted to convey materials by a vibratory movement of the conveying deck, a flexible member supporting the conveying deck for vibration thereof, a pair of ears disposed one at each side of the conveying deck and depending below the underside of the deck, a pad on the underside of the conveying deck disposed between the ears, said pad abutting one side of the flexible member, a clamp bar abutting the other side of the flexible member opposite the pad to secure the flexible member to the conveying deck between the pad and the clamp bar, and a locking pin secured to the clamp bar and extending through the ears to secure the clamp bar to the conveying deck and securing the clamp bar against the flexible member and the pad.

2. A vibrating conveyor comprising a conveying deck adapted to convey materials by a vibratory movement of the conveying deck, a flexible member supporting the conveying deck for vibration thereof, a pair of ears disposed one at each side of the conveying deck and depending below the underside of the deck, a pad on the underside of the conveying deck disposed between the ears, said pad abutting one side of the flexible member, a clamp bar abutting the other side of the flexible member opposite the pad to secure the flexible member to the conveying deck between the pad and the clamp bar, said clamp bar including a thimble and said ears each including an aperture aligned with the thimble, and a spring locking pin extending through said thimble and said apertures to secure the clamp bar to the conveying deck and securing the clamp bar against the flexible member and the pad.

3. A vibrating conveyor comprising a conveying deck adapted to convey materials by a vibrating movement of the conveying deck, a base member for the conveyer, a flexible member supporting the conveying deck on the base member for vibration of the conveying deck relatively to the base member, said flexible member extending upwardly between the base member and the conveying deck, a pad on the deck abutting one side of the flexible member at the upper end thereof, a clamp bar abutting the other side of the flexible member opposite the pad to secure the upper end of the flexible member to the conveying deck between the pad and the clamp bar, a locking pin joining the clamp bar to the conveying deck and securing the clamp bar against the flexible member and the pad, a second pad on the base member abuttnig one side of the flexible member at the lower end thereof, a second clamp bar abutting the other side of the flexible member opposite the second pad to secure the lower end of the flexible member to the base member between the second pad and the second clamp bar, and a second locking pin joining the second clamp bar to the base member and securing the second clamp bar against the flexible member and the second pad.

4. A vibrating conveyor comprising a conveying deck adapted to convey materials by a vibratory movement of the conveying deck, a base member for the conveyor, a flexible member supporting the conveying deck on the base member for vibration of the conveying deck relatively to the base member, said flexible member extending upwardly between the base member and the conveying deck, a pad on the deck abutting one side of the flexible member at the upper end thereof, a clamp bar abutting the other side of the flexible member opposite the pad to secure the upper end of the flexible member to the conveying deck between the pad and the clamp bar, a spring locking pin joining the clamp bar to the conveying deck and securing the clamp bar against the flexible member and the pad, a second pad on the base member abutting one side of the flexible member at the lower end thereof, a second clamp bar abutting the other side of the flexible member opposite the second pad to secure the lower end of the flexible member to the base member between the second pad and the second clamp bar, and a spring locking pin joining the second clamp bar to the base member and securing the second clamp bar against the flexible member and the second pad.

5. A vibrating conveyor comprising a conveying deck adapted to convey materials by a vibratory movement of the conveying deck, a base member for the conveyor, a flexible member supporting the conveying deck on the base member for vibration of the conveying deck relatively to the base member, said flexible member extending upwardly between the base member and the conveying deck, a pad on the deck abutting one side of the flexible member at the upper end thereof, a clamp bar abutting the other side of the flexible member opposite the pad to secure the upper end of the flexible member to the conveying deck between the pad and the clamp bar, a spring locking pin secured to the conveying deck and to the clamp bar joining the clamp bar to the conveying deck and securing the clamp bar against the flexible member and the pad, said spring locking pin being disposed behind the clamp bar, a second pad on the base member abutting one side of the flexible member at the lower end thereof, a second clamp bar abutting the other side of the flexible member opposite the second pad to secure the lower end of the flexible member to the base member between the second pad and the second clamp bar, a second spring locking pin secured to the base member and to the second clamp bar joining the second clamp bar to the base member and securing the second clamp bar against the flexible member and the second pad, and said second spring locking pin being disposed behind the second clamp bar.

6. A vibrating conveyor comprising a conveying deck adapted to convey materials by a vibrating movement of the conveying deck, a base member for the conveyor, a flexible member supporting the conveying deck on the base member for vibration of the conveying deck relatively to the base member, said flexible member extending upwardly between the base member and the conveying deck, a pair of ears disposed one at each side of the base member and extending upwardly therefrom to above the base member, a pad on the base member disposed between the ears, said pad abutting one side of the flexible member, a clamp bar abutting the other side of the flexible member opposite the pad to secure the flexible member to the base member between the pad and the clamp bar, and a locking pin secured to the clamp bar and extending through the ears to secure the clamp bar to the base member and securing the clamp bar against the flexible member and the pad.

7. A vibrating conveyor comprising a conveying deck adapted to convey materials by a vibrating movement of the conveying deck, a base member for the conveyor, a flexible member supporting the conveying deck on the base member for vibration of the conveying deck relatively to the base member, said flexible member extending upwardly between the base member and the conveying deck, a pair of ears disposed one at each side of the base member and extending upwardly therefrom to above the base member, a pad on the base member disposed between the ears, said pad abutting one side of the flexible member, a clamp bar abutting the other side of the flexible member opposite the pad to secure the flexible member to the base member between the pad and the clamp bar, said clamp bar including a thimble and said ears each including an aperture aligned with the thimble, and a spring locking pin extending through said thimble and said apertures to secure the clamp bar to the base member and securing the clamp bar against the flexible member and the pad.

8. A vibrating conveyor comprising a conveying deck adapted to convey materials by a vibrating movement of the conveying deck, a base member for the conveyor, a flexible member supporting the conveying deck on the base member for vibration of the conveying deck relatively to the base member, said flexible member extending upwardly between the base member and the conveying deck, a pad on the base member abutting one side of the flexible member, a clamp bar abutting the other side of the flexible member opposite the pad to secure the flexible member to the base member between the pad and the clamp bar, a locking pin joining the clamp bar to the base member and securing the clamp bar against the flexible member and the pad, said base member comprising at least two base member sections disposed one in line with the other, one base member section including a connector bar extending from the one base member section to the other base member section, said other base member section including an element disposed adjacent the connector bar, said connector bar and element including aligned apertures, and a spring locking pin extending through the apertures of the connector bar and the element for joining said one base member section to the other base member section.

References Cited in the file of this patent

UNITED STATES PATENTS

| | | |
|---|---|---|
| 1,922,198 | Crawford et al. | Aug. 15, 1933 |
| 2,378,499 | Rapp | June 19, 1945 |
| 2,669,447 | O'Connor | Feb. 16, 1954 |
| 2,754,716 | Bourns | July 17, 1956 |

FOREIGN PATENTS

| | | |
|---|---|---|
| 270,069 | Great Britain | May 5, 1927 |